March 8, 1938. F. KOENIGKRAMER ET AL 2,110,227
LITTER OR CARRIAGE
Filed May 13, 1936
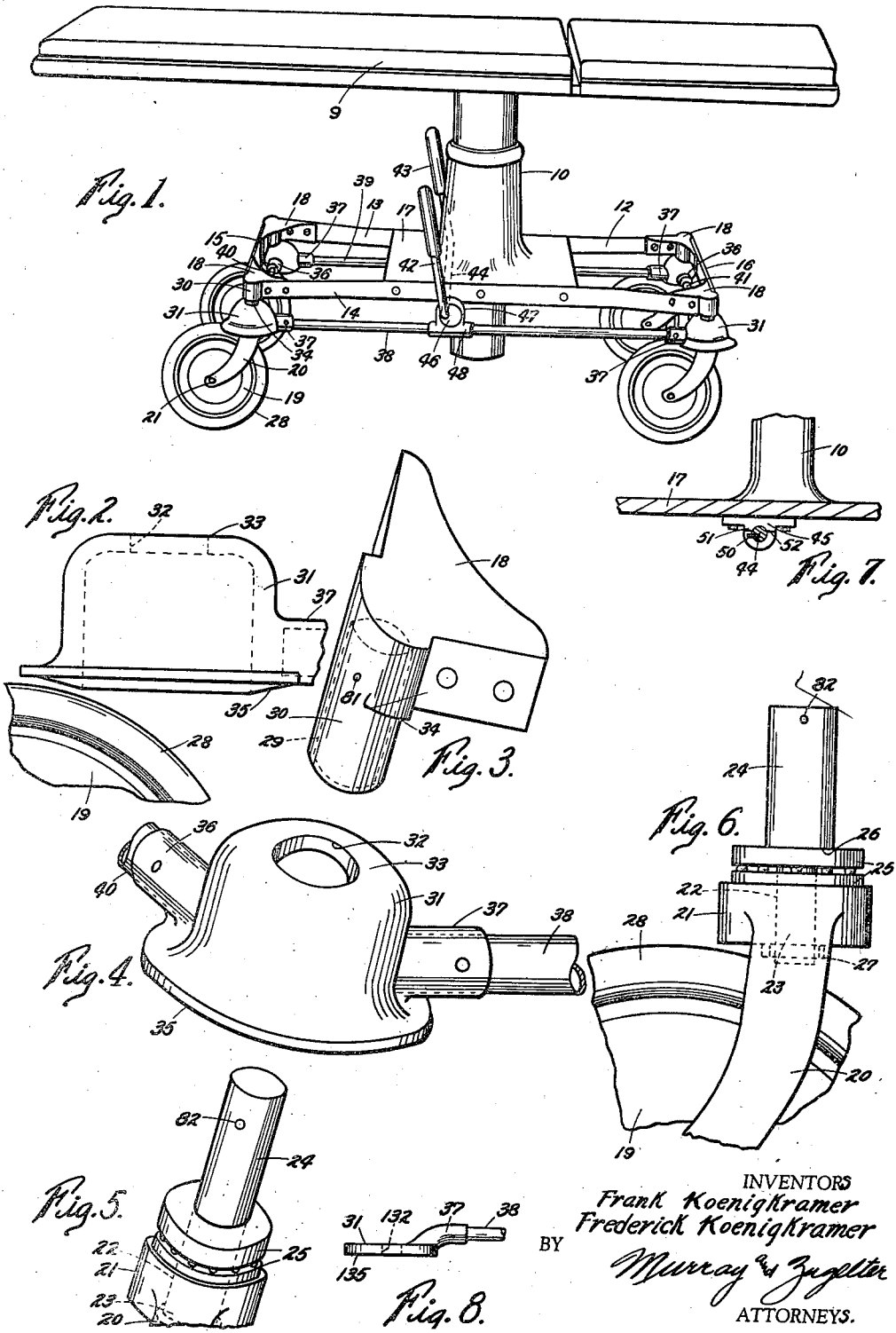
INVENTORS
Frank Koenigkramer
Frederick Koenigkramer
BY Murray & Zugelter
ATTORNEYS.

Patented Mar. 8, 1938

2,110,227

UNITED STATES PATENT OFFICE 2,110,227

LITTER OR CARRIAGE

Frank Koenigkramer and Frederick Koenigkramer, Cincinnati, Ohio

Application May 13, 1936, Serial No. 79,529

16 Claims. (Cl. 188—2)

This invention relates to a litter or carriage, and especially to one which is tractionally supported upon swivel mounted wheels or casters. Although the device herein specifically disclosed is of a type suitable for hospital use, it may be modified in its non-essential details, for other uses. For example, the invention may be applied to operating tables, treatment tables, certain kinds of tractional chairs, or carriages generally.

An object of the invention is to provide a litter or carriage with an improved form of means for braking the wheels thereof to prevent rolling of the litter or carriage.

A further object of the invention is to provide a wheel braking mechanism including means whereby the brake may be applied or released relative to all of the carriage wheels, in unison.

Another object of the invention is to provide in a device of the character stated, a brake actuating means that may be manipulated from either side of the carriage with equal facility.

A further object of the invention is to provide a wheel braking means and associated manipulating mechanism, which may be applied to existing types of litters or carriages.

The foregoing and other objects are attained by the means described herein and disclosed in the accompanying drawing, in which:

Fig. 1 is a perspective view of a litter or carriage embodying the invention.

Fig. 2 is an elevational view of a brake shoe of the invention, showing its cooperative relationship to a swivel wheel or caster of the carriage.

Fig. 3 is a perspective view of a frame corner gusset or bracket which forms a detail of the invention.

Fig. 4 is a fragmental perspective view of a brake shoe such as is disclosed in Fig. 2.

Fig. 5 is a fragmental perspective view of a swivel wheel or caster mounting stud or pin which is adapted to extend through the shoe of Fig. 4 and into a bore of the Fig. 3 bracket, there to be secured for establishing the relationship shown in Fig. 1.

Fig. 6 is a fragmental elevational view of a caster with the wheel applied thereto.

Fig. 7 is a cross sectional view on a reduced scale, showing a mounting means for the brake levers disclosed in Fig. 1.

Fig. 8 is an elevational view on a reduced scale, showing a modified form of brake shoe.

With reference to Fig. 1 of the drawing, the character 9 indicates a suitable table portion and 10 indicates generally an elevating means for the table portion. The elevating means disclosed happens to be an hydraulic lift mechanism such as is commonly used in connection with barber chairs and the like. The details of construction of both the table and the table elevator or lift means, are entirely immaterial to the present invention, and these elements may be modified or even omitted, depending upon the use to be made of the carriage.

The character 12 indicates generally a carriage chassis or frame comprising side members 13 and 14, and end members 15 and 16. The base 17 of the elevating means may properly be considered a part of the chassis or frame. The chassis or frame, by preference, is substantially rectangular of shape, and its four corners may be secured and strengthened by means of the angle brackets or gussets 18, a detailed view of which is shown in Fig. 3. With the four gusset members bolted, riveted, or otherwise secured to the side and end members of the chassis, a substantially rigid frame structure is established.

The corners of the frame structure are each provided with a swivel mounted wheel or caster, the wheels being indicated by the characters 19. As the casters at the four corners of the frame are identical in construction, a description of one will suffice for the others also. The casters comprise the extended forks or arms 20 which, at their lower ends, carry an axle 21 for rotatably mounting the wheel 19. The upper ends of the arms 20 are connected by means of a transverse caster pin mounting part 21 which has a bore 22 for receiving the threaded lower end 23 of pin or stud 24, an anti-friction bearing means 25 being interposed between a shoulder 26 on the pin or stud, and the nut 27 which secures the threaded lower end of the member 24. The caster itself may be of ordinary construction, the bearing means mentioned above providing for rotation of the caster pin or stud 24 relative to the parts located below the bearing means 25. It is considered preferable, though not necessary, that the wheel 19 be provided with a tire 28, which may be of rubber or other suitable material. Like any other swivel caster, the axle 21 is disposed to one side of the vertical axis of the caster pin or stud 24.

The upper end of the caster pin or stud 24 is adapted to be inserted in the bore 29 of a sleeve or caster pin support 30 which may be integral with the gusset element 18 if desired. Any suitable means may be provided for securing the pin in the bore 29 of sleeve 30, and by way of example, cooperative apertures 81 and 82 may be provided in the sleeve 30 and pin or stud 24, for reception of a drive pin or the like, to fasten the caster structure so that it may not accidentally be disassociated from the chassis or frame of the carriage. A carriage provided with swivel mounted wheels or casters as above described, may be rolled in any direction, as is well known, and while this feature is very desirable in certain types of carriages, it presents the problem of holding the carriage stationary while objects are placed upon or removed from the table portion thereof. In the case of hospital litters or carriages, it is necessary to the safety and comfort of a patient being placed upon or removed from the table portion, that the wheels of the carriage be locked, not only against rotation, but against swivel movement of the casters. To our knowledge such litters or carriages have been provided with braking means to hold the carriage in a stationary condition, but the braking means heretofore employed were objectionable for various reasons well known to hospital attendants and others who would have occasion to use swivel wheel type carriages.

As stated in the introduction, we have provided a novel braking means which will under all conditions of use, hold the entire carriage or litter stationary when desired. Said braking means comprises a brake shoe 31 associated with each caster in a novel relationship thereto. The shoe may be substantially bell-shaped as disclosed in Figs. 1, 2, and 4, or it may be substantially flat as disclosed in the modification of Fig. 8. Each shoe has an aperture 32 adapted to receive the hollow sleeve or caster pin support 30, so that its upper portion 33 may abut a shoulder 34 provided on the sleeve or pin support. The purpose of the abutment is to limit the elevation of the brake shoe in its vertical movement along the sleeve or pin support. As will be understood, means other than the abutment 34 may be provided to thus limit the elevating movement of the brake shoe, if desired. The shoe preferably is formed so as to provide an annular braking area or face 35 which is adapted to descend upon the tire of the wheel 19 and effect a braking action thereon, regardless of the direction of extension of the caster arms 20. For example, if the wheels of Fig. 1 were turned to provide for sidewise movement of the carriage, it would still be possible for the shoe to descend upon and lock the wheel not only against rotation about its axle 21, but also against any swivel movement about the vertical pin 24. In other words, the shoe will operate to tightly abut the tire of the wheel in all swivelled positions of the caster, by reason of a mere lowering of the entire shoe 31 along the sleeve or caster pin support 30. As will be understood, elevating of the shoe member 31 until it abuts the shoulder 34 shown in Fig. 3 will place the brake shoe out of contact with the tire and permit free rotation and swivel movement of the wheel.

Referring to Fig. 8, which shows a modified form of brake shoe, the character 135 indicates the braking area or face which corresponds to the area or face 35 of Fig. 2, and the aperture 132 corresponds to the aperture 32 shown in Fig. 2. Substitution of the Fig. 8 brake shoe for that shown in Fig. 4 would result in a braking action comparable with that above described. The aperture 132 would receive the sleeve or pin bearing support 30, and the mounting of the shoe would be sufficiently loose to permit elevating and lowering of the shoe relative to the tire of the wheel substantially as disclosed in Fig. 2.

It is to be understood that the braking area or face 135, in the Fig. 8 modification, may be either annular or disc-like in form.

At this point in the description, it may be noted that the braking area or face of the brake shoe is adapted to contact the wheel periphery or tire at a substantial distance from the caster pin axis, and it is for this reason that the shoe not only precludes rotation of the wheel about its horizontal axis 21, but it also affords sufficient leverage to arrest the swivel movement of the caster about its pivotal pin. It should be noted also that the braking area or face, which bears upon the upper portion of the wheel or tire, may be substantially horizontal, or slightly inclined as shown, to secure the fullest extent of braking contact upon the wheel or tire. In the particular construction illustrated, the annular braking area or face 35 is shown slightly inclined to the horizontal. The degree of inclination of the braking surface, however, or the lack of any inclination whatever, will of course depend upon the size of the wheel and/or the distance of the braking surface from the vertical axis of the caster pin. Thus, if the brake shoe is extended sufficiently to dispose the braking area directly above the axle of the caster wheel, the braking area would probably be horizontal and substantially flat.

Means are provided for bodily elevating and lowering the brake shoes in unison. To this end, the brake shoes may all be connected together to form a rectangular frame as disclosed in Fig. 1, by providing the extensions or hollow bosses 36 and 37 substantially at right angles to one another, said extensions or bosses being adapted to support the connecting rods or bars 38, 39, 40, and 41 in the rectangular relationship disclosed in Fig. 1. The connecting rods are adapted to have their opposite ends fixedly secured relative to the extension of the brake shoes, so as to provide a rigid brake frame structure. The means whereby the ends of the connecting rods are fixed to the brake shoes is immaterial to the invention, as they may be pinned, bolted, or screw threaded in the positions illustrated in Fig. 1.

From the foregoing, it should be understood that some form of means is necessary to provide for bodily elevating and lowering the brake shoes in unison, without longitudinally moving the brake rods. Said means may be of one form or another as may be suggested by the disclosure of the exemplary construction shown in the drawing, which construction comprises a pair of handle bars 42 and 43 connected together by means of a transverse rod member 44 and so arranged as to lift or lower the rods 38 and 39 bodily when the hand levers or manipulating means 42 and 43 are moved through an arc approximating 180° or less. By means of suitable brackets or bearings 45, supported upon the carriage or upon the under face of the base 17, the transverse shaft 44 which connects the handle members may be mounted for rotation about an axis transverse to the major axis of the carriage. Fixed to the transverse shaft 44 is an eccentric 46, which may be an offset center mounted disc or crank element which, when rotated by means of either of the handles or manipulating means, will impose a downward directional force upon the connecting rod 38. To obviate the use of springs for returning the brake shoes to the normal or elevated position, however, it is desirable to surround the eccentric with a housing or box 47 having a sleeve portion 48 in which the connecting rod 38 is slidably received. Thus, by grasping one or the other of the handles 42 or 43 and moving it to the left, to approximately a horizontal position, the eccentric 46 will act to elevate the housing or box 47, and thereby lift the connecting rod 38 and the brake shoes which are fixed to the opposite ends thereof. By moving the manipulating handles to the right, the eccentric imposes a downward force upon its housing or box 47, thereby to bodily lower the connecting rod 38 and the brake shoes at the opposed ends thereof, for applying a braking force to the wheels and precluding also any swivel movement of the casters, as hereinbefore described. It may here be stated that the connecting rods 38 and 39 are preferably of a material, such as a resilient metal, so that they may bend slightly while transmitting the downward force of the eccentric to the brake shoes at the opposite ends of the rods. An important advantage attending this construction, is that the brakes will operate without substantial impairment of their braking effect, whether the tires of the wheels be new or worn. When the tires are worn, the bending of the connecting rods will be less pronounced than when the tires are new. The throw of the eccentric may be such that the brake action results from moving the manipulating lever or levers to the intermediate position shown in Fig. 1, so that wearing of the wheel tires may be compensated for by merely moving the manipulating handles further to the right for securing the desired braking force. As will be understood, the maximum braking force is secured when the handles 42 and 43 are disposed to a substantially horizontal position at the right hand side of the elevating mechanism 10, whereas complete release of the braking force is effected by moving the manipulating handles to the left. As is obvious, this condition may be reversed if desired. It will be obvious also that by increasing the throw of the eccentric, a movement of the manipulating handles to apply and release the brakes, may readily be limited to an arc much less than 180°.

Although the description up to this point has mentioned only one eccentric such as 46, it is to be understood that a similar eccentric and housing or box therefor is provided at the side of the carriage opposite to that shown in Fig. 1, so that unitary bodily elevating and lowering of the connecting rods 38 and 39 will result from manipulation of one of the handles 42 or 43. By providing the double handle or manipulating means disclosed, all of the wheels can be braked simultaneously by an attendant stationed at either one side of the other of the carriage, thereby providing for quick and safe handling of a patient being transferred to or from the table portion.

A carriage provided with the braking means herein illustrated and described possesses the highest degree of surety against accidents or difficulties that would be encountered by reason of a carriage shifting its position while patients are being transferred, and it will be noted also that there are no depending brake parts to interfere with rolling the carriage over doors sills or other obstructions in the floor or surfaces over which the carriage is operative. Moreover, the present construction provides for a secure braking of the wheel rotation, as well as the caster body rotation, with a minimum of effort on the part of an attendant. The effort required to condition the wheels for non-rotation, is but a faction of that required for precluding accidental movement of other types of carriages wherein the entire device is jacked up at its four corners to remove the wheels thereof from contact with the floor.

The stop 50 carried by the transverse shaft 44, as disclosed in Fig. 7 is adapted to strike stationary abutments 51 and 52, for limiting the rotational movement of the shaft and the arcuate movement of the levers 42 and 43. It may be noted, in conclusion, that the transverse connecting rods indicated at 40 and 41 of Fig. 1, may be omitted if desired, and that in some instances, it may be sufficient to provide brake shoes for only one front and one rear wheel of the carriage, in which event, the brake means disclosed at the far side of the Fig. 1 carriage, could be omitted entirely, retaining, however, the double actuating means or handles 42 and 43. As stated before, the type of table and elevator therefor may be varied to suit the requirements of the carriage, it being obvious that an elevator is not a necessary element of the device and that the table portion might just as well be supported upon the chassis by one or more standards or legs as in the less expensive types of tractional litters or carriages.

We claim:

1. A carriage comprising in combination, a swivel-mounted rotatable wheel tractionally supporting the carriage, a shiftable braking shoe for said wheel, said shoe having a braking face substantially surrounding the axis of swivel movement of the wheel, means substantially concentric with said axis for guiding the braking shoe during shifting movement thereof, and means for shifting the braking shoe toward and from the wheel in substantially the direction of extension of said axis, said shifting means including a manipulating handle on the carriage remote from the braking shoe.

2. A carriage having in combination therewith a swivel caster including a wheel tractionally supporting the carriage, said caster including an upright swivel pin and an axle for the wheel, the wheel axle being located a substantial distance from the swivel pin axis, an upright swivel pin support means on the carriage, a shiftable braking shoe encircling the swivel pin support means to be guided by said pin support means while moving toward and from the periphery of the wheel, said shoe including an annular braking surface substantially concentric with the swivel pin, and means for lowering and elevating the braking shoe toward and from the wheel periphery.

3. A carriage having in combination therewith a swivel caster including a wheel tractionally supporting the carriage, said caster including an upright swivel pin and an axle for the wheel, the wheel axle being located a substantial distance from the swivel pin axis, an upright swivel pin support means on the carriage, a braking shoe vertically shiftable toward and from the periphery of the wheel, means substantially concentric with the swivel pin axis for guiding the shoe when shifted, said shoe including an annular braking surface substantially concentric with the swivel pin and radially spaced therefrom to contact the wheel periphery at a point remote from the point at which an extension of the swivel pin axis would meet the wheel periphery, and means for lowering and elevating the braking shoe toward and from the wheel periphery.

4. The combination of a carriage, a swivel caster including a wheel tractionally supporting the carriage, said caster including an upright swivel pin and an axle for the wheel, an upright swivel pin support means on the carriage, a braking shoe including an annular braking abutment disposed about the axis of the swivel pin support means and arranged for vertical shifting movement relatively toward and from the periphery of the wheel, a substantially horizontal resilient rod having opposite ends, one of said ends being carried by the braking shoe, means for supporting the other end of said rod, and means operative upon the rod intermediate its ends for lowering that end thereof which carries the braking shoe, causing the braking abutment of the shoe to approach the periphery of the caster wheel.

5. The combination of a carriage, a swivel caster including a wheel tractionally supporting the carriage, said caster including an upright swivel pin and an axle for the wheel, an upright swivel pin support means on the carriage, a braking shoe including an annular braking abutment disposed about the axis of the swivel pin support means and arranged for vertical shifting movement relatively toward and from the periphery of the wheel, a substantially horizontal resilient rod having opposite ends, one of said ends being carried by the braking shoe, means for supporting the other end of said rod, means operative upon the rod intermediate its ends for lowering that end thereof which carries the braking shoe, causing the braking abutment of the shoe to approach the periphery of the caster wheel, and means substantially precluding longitudinal shifting of the resilient rod.

6. The combination of a carriage, a plurality of swivel casters each including a rotatable wheel tractionally supporting the carriage, and a pin about which the wheel may swivel independently of its rotational movement, a braking shoe for each wheel, each of said shoes including an annular braking abutment disposed about the axis of one of said pins and arranged for vertical shifting movement relatively toward and from the periphery of a wheel, a substantially horizontal rod having opposite ends, each of which ends has a mounting upon one of the braking shoes, and means on the carriage for applying a force to the rod at a point intermediate its ends, to shift the shoe substantially in unison and advance the braking abutments thereof toward the peripheries of the wheels.

7. The combination of a carriage, a plurality of swivel casters each including a rotatable wheel tractionally supporting the carriage, and a pin about which the wheel may swivel independently of its rotational movement, a braking shoe for each wheel, each of said shoes including an annular braking abutment disposed about the axis of one of said pins and arranged for vertical shifting movement relatively toward and from the periphery of a wheel, a substantially horizontal rod having opposite ends, each of which ends has a mounting upon one of the braking shoes, and means comprising a cam rotatably supported on the carriage for applying a force to the rod at a point intermediate its ends, to shift the shoes substantially in unison and advance the braking abutments thereof toward the peripheries of the wheels.

8. The combination of a carriage, a plurality of swivel casters each including a rotatable wheel tractionally supporting the carriage, and a pin about which the wheel may normally swivel independently of its rotational movement, a braking shoe for each wheel, each of said shoes including a substantially continuous braking abutment disposed about the axis of its associated pin, and arranged for vertical shifting movement toward and from the wheels, a rod connecting one of said shoes to the other shoe in spaced apart relationship, and means including manipulating handles at opposite sides of the carriage for applying to the rod a force for bodily shifting the rod and advancing the shoes toward the wheels substantially in unison.

9. In a carriage, the combination of a chassis, a plurality of wheels tractionally supporting the chassis, a frame having a plurality of braking abutments, one overlying each wheel, and means including manipulating handles at opposite sides of the carriage operative to lower the frame and dispose said braking abutments substantially simultaneously in braking contact upon the peripheries of the wheels.

10. In a carriage, the combination of a substantially horizontal chassis, a plurality of swivel casters tractionally supporting the chassis, a brake actuating frame mounted upon the chassis in substantial parallelism therewith and guided thereon for bodily movement vertically while in a plane substantially parallel to the plane of the chassis, a plurality of braking elements each fixed upon the brake actuating frame, one of such elements overlying each swivel caster, and means including manipulating handles at opposite sides of the carriage operative to lower the frame and dispose said braking elements substantially simultaneously in braking contact upon the peripheries of the caster wheels.

11. The combination with a carriage, of a plurality of swivel mounted wheel tractionally supporting the carriage, and braking means for said wheels comprising a plurality of braking elements, one overlying each wheel, and each having an annular braking surface concentric with the swivel mounting of its corresponding wheel, and means including manipulating handles at opposite sides of the carriage operative to place the braking elements and their corresponding swivel mounted wheels simultaneously, in frictional braking contact in all swiveled positions of the wheels.

12. The combination with a carriage, of a plurality of swivel mounted wheels tractionally supporting the carriage, and braking means for said wheels comprising a plurality of braking elements, one overlying each wheel, and each having an annular braking surface concentric with the swivel mounting of its corresponding wheel, and means including rigidly connected unitarily movable manipulating handles at opposite sides of the carriage operative to place the braking elements and their corresponding swivel mounted wheels in frictional braking contact in all swiveled positions of the wheels.

13. In a carriage, the combination of a horizontal chassis, a plurality of wheels tractionally supporting the chassis, a brake actuating frame mounted horizontally upon the carriage and guided thereon for bodily movement vertically while in a plane substantially parallel to the plane of the chassis, a plurality of braking elements each fixed upon the brake actuating frame, one of such elements overlying each wheel, and means to lower the frame and dispose said braking elements substantially simultaneously in braking contact upon said wheels.

14. In a carriage, the combination of a chassis having sides arranged to form a substantially horizontal rectangle with four corners, a plurality of wheels each tractionally supporting one corner of the chassis, a substantially horizontal brake frame of substantially the same size as the horizontal rectangle formed by said sides of the chassis, and having near its corners a plurality of braking abutments, one overlying each wheel, and means to bodily lower the frame for disposing said braking abutments substantially simultaneously in braking contact upon the peripheries of the wheel.

15. In a carriage, the combination of a horizontal chassis, a plurality of swivel casters, each including a rotatable wheel, tractionally supporting the carriage, and a pin about which the wheel may normally swivel independently of its rotatable movement, a bodily movable brake frame of substantially the same size as the chassis and means for supporting said brake frame beneath and in substantial parallelism with the horizontal chassis, said brake frame having a plurality of braking abutments corresponding in number to the number of wheels, said braking abutments each overlying a wheel above its axis of rotation, and means requiring but a single operation to bodily lower the entire brake frame for disposing all of said braking abutments in braking contact upon substantially the uppermost portions of the wheel peripheries.

16. In a carriage of the character described, the combination of a chassis having sides arranged to form a substantially horizontal structure with four corners, a wheel near each corner for tractionally supporting the chassis, a plurality of braking abutments for contacting the peripheries of the wheels of the carriage, a pair of long brake rods each of which is substantially co-extensive with a side of the chassis and joins two of the braking abutments, and means operative jointly upon the rods intermediate their ends, to advance the braking abutments substantially simultaneously upon the wheel peripheries.

FRANK KOENIGKRAMER.
FREDERICK KOENIGKRAMER.